United States Patent
Shi

(10) Patent No.: US 12,185,327 B2
(45) Date of Patent: Dec. 31, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 386 days.

(21) Appl. No.: 17/465,497

(22) Filed: Sep. 2, 2021

(65) Prior Publication Data

US 2021/0400707 A1 Dec. 23, 2021

Related U.S. Application Data

(63) Continuation of application No. PCT/CN2019/078786, filed on Mar. 19, 2019.

(51) Int. Cl.
*H04W 72/23* (2023.01)
*H04W 74/00* (2009.01)
*H04W 74/0833* (2024.01)

(52) U.S. Cl.
CPC ......... *H04W 72/23* (2023.01); *H04W 74/002* (2013.01); *H04W 74/0833* (2013.01)

(58) Field of Classification Search
CPC .............. H04W 72/23; H04W 74/008; H04W 74/0833
See application file for complete search history.

(56) References Cited

U.S. PATENT DOCUMENTS

| 10,405,342 | B2 | 9/2019 | Wang et al. |
| 2012/0281640 | A1 | 11/2012 | Xu et al. |
| 2014/0126520 | A1 | 5/2014 | Quan et al. |

(Continued)

FOREIGN PATENT DOCUMENTS

| CN | 101505538 A | 8/2009 |
| CN | 101784121 A | 7/2010 |

(Continued)

OTHER PUBLICATIONS

Advisory Action for U.S. Appl. No. 17/469,818 issued Nov. 1, 2022. 3 pages.

(Continued)

*Primary Examiner* — Donald L Mills
(74) *Attorney, Agent, or Firm* — PERKINS COIE LLP

(57) ABSTRACT

The implementations of the present disclosure disclose a wireless communication method, a terminal device, and a network device. Said method includes: a terminal device sending a first message to a network device, the first message including a preamble identifier (ID) for a random access and an uplink message, the uplink message including a first identifier; the terminal device determining, according to the first identifier, a target radio network temporary identifier (RNTI) used for monitoring a physical downlink control channel (PDCCH); the terminal device monitoring a PDCCH scrambled by the target RNTI; and according to a second message scheduled by the PDCCH and the uplink message, determining whether the contention collision is solved.

10 Claims, 5 Drawing Sheets

(56) References Cited

U.S. PATENT DOCUMENTS

| | | | |
|---|---|---|---|
| 2016/0066255 A1 | 3/2016 | Marinier et al. | |
| 2016/0100425 A1 | 4/2016 | Dinan | |
| 2017/0099674 A1 | 4/2017 | Han et al. | |
| 2017/0105198 A1 | 4/2017 | Fu et al. | |
| 2018/0007709 A1 | 1/2018 | Seo et al. | |
| 2019/0053272 A1 | 2/2019 | Tsai | |
| 2019/0174554 A1 | 6/2019 | Deenoo et al. | |
| 2019/0215861 A1 | 7/2019 | Son | |
| 2019/0335515 A1 | 10/2019 | Chen et al. | |
| 2019/0349915 A1 | 11/2019 | Ahn et al. | |
| 2020/0045650 A1* | 2/2020 | Suzuki | H04W 52/36 |
| 2020/0068616 A1 | 2/2020 | Qian et al. | |
| 2020/0100297 A1 | 3/2020 | Agiwal et al. | |
| 2020/0107372 A1 | 4/2020 | Agiwal et al. | |
| 2020/0146069 A1 | 5/2020 | Chen et al. | |
| 2020/0187242 A1 | 6/2020 | Höglund et al. | |
| 2020/0187266 A1* | 6/2020 | Lou | H04W 72/30 |
| 2020/0288506 A1* | 9/2020 | Lei | H04W 74/0833 |
| 2020/0322948 A1 | 10/2020 | Xue et al. | |
| 2021/0029746 A1 | 1/2021 | Turtinen et al. | |
| 2021/0051472 A1 | 2/2021 | Shih et al. | |
| 2021/0168862 A1 | 6/2021 | Murray et al. | |
| 2021/0329703 A1 | 10/2021 | Yang et al. | |
| 2021/0329704 A1 | 10/2021 | Yang et al. | |
| 2022/0070944 A1* | 3/2022 | Lin | H04W 74/006 |
| 2022/0124830 A1* | 4/2022 | Wu | H04W 74/0841 |

FOREIGN PATENT DOCUMENTS

| | | |
|---|---|---|
| CN | 102231917 A | 11/2011 |
| CN | 102548015 A | 7/2012 |
| CN | 102595634 A | 7/2012 |
| CN | 102821454 A | 12/2012 |
| CN | 102932917 A | 2/2013 |
| CN | 103220811 A | 7/2013 |
| CN | 107493608 A | 12/2017 |
| CN | 107872899 A | 4/2018 |
| CN | 108271275 A | 7/2018 |
| CN | 108282899 A | 7/2018 |
| CN | 108282901 A | 7/2018 |
| CN | 108633009 A | 10/2018 |
| CN | 109391967 A | 2/2019 |
| CN | 109392188 A | 2/2019 |
| EP | 3585112 A1 | 12/2019 |
| WO | 2013020494 A1 | 2/2013 |
| WO | 2018151230 A1 | 8/2018 |

OTHER PUBLICATIONS

Examination Report for European Application No. 19920020.5 issued Nov. 11, 2022. 7 pages.
Examination Report with European Application No. 19920463.7 Sep. 29, 2022. 9 pages.
Final Office Action for U.S. Appl. No. 17/469,818 issued Aug. 26, 2022. 32 pages.
Sony, Considerations on initial access procedures for NR unlicensed. R2-1817075, 3GPP TSG RAN WG2 Meeting #103, Spokane, USA, Nov. 12-16, 2018. 4 pages.
Examination report of the European application No. 19920463.7 issued on Jul. 6, 2023. 10 pages.
Second Office Action of the Chinese application No. 202111846451, issued on Apr. 19, 2023. 20 pages with English translation.
Non-Final Office Action for U.S. Appl. No. 17/469,818 issued May 21, 2022. 39 pages.
Examination Report for European Application No. 19920020.5 issued Apr. 13, 2023. 7 pages.
Notice of Reasons for Refusal for Japanese Application No. 2021-556595 issued Feb. 17, 2023. 9 pages with English translation.
Examination Report for European Application No. 19920380.3 issued Feb. 6, 2023. 11 pages with English translation.
Examination Report for European Application No. 19920463.7 issued Feb. 3, 2023. 8 pages.
Examination Report for Indian Appliation No. 202127040784 issued Jan. 20, 2023. 7 pages with English translation.
First Office Action for Chinese Application No. 202111184645.1 issued Jan. 19, 2023. 18 pages with English translation.
First Office Action for Chinese Application No. 202111305652.2 issued Nov. 18, 2022. 14 pages with English translation.
First Office Action for Chinese Application No. 202111344178.4 issued Jan. 9, 2023. 18 pages with English translation.
Huawei et al. "Discussion on 2-step RACH Procedure" R2-167588; 3GPP TSG-RAN2 Meeting #96; Reno, USA; Nov. 14-18, 2016. 3 pages.
Intel Corporation "Further consideration of 2-step CBRA" R2-1816697; 3GPP TSG RAN WG2 Meeting #104; Spokane, USA; Nov. 12-16, 2018. 6 pages.
Non-Final Office Action for U.S. Appl. No. 17/469,818 issued Nov. 3, 2021. 29 pages.
CATT "Consideration on 2-step RA" R2-1700205; 3GPP TSG RAN WG2 Meeting Ad Hoc; Spokane, USA, Jan. 17-19, 2017. 6 pages.
Extended European Search Report for European Application No. 19920020.5 issued Feb. 8, 2022. 7 pages.
Extended European Search Report for European Application No. 19920380.3 issued Apr. 12, 2022. 17 pages.
Extended European Search Report for European Application No. 19920463.7 issued Jan. 26, 2022. 11 pages.
Huawei et al. "Two-step RACH procedure for NR-U" R2-1816617; 3GPP TSG-RAN WG2 Meeting #104; Spokane, USA; Nov. 12-16, 2018. 4 pages.
Non-Final Office Action for U.S. Appl. No. 17/469,818 issued Feb. 11, 2022. 25 pages.
OPPO "2-steps RACH procedure for NR-U" R2-1816263; 3GPP TSG-RAN WG2 Meeting #104; Spokane, USA, Nov. 12-18, 2018. 4 pages.
Panasonic "Discussion on 2-step RACH procedure" R1-1902394; 3GPP TSG-RAN WG1 #96; Athens, Greece; Feb. 25-Mar. 1, 2019. 4 pages.
Qualcomm Incorporated "Report of Email Discussion [103#55][NR-U] 2-step RACH Model and Initial Information Contents (Qualcomm)" R2-1815564; 3GPP TSG-RAN WG2 Meeting #103bis; Chengdu, China, Oct. 8-12, 2018. 17 pages.
Samsung "NR 2-step random access procedure" R1-1700892; 3GPP TSG RAN WG1 NR Ad Hoc; Spokane, Washington, USA; Jan. 16-20, 2017. 5 pages.
Samsung "Procedure for Two-step Rach" R1-1902242; 3GPP TSG-RAN WG1 Meeting #96; Athens, Greece, Feb. 25-Mar. 1, 2019. 4 pages.
ZTE "Summary of 7.2.1.1 Channel Structure for Two-step Rach" R1-1903435; 3GPP TSG-RAN WG1 Meeting #96; Athens, Greece, Feb. 25-Mar. 1, 2019. 28 pages.
ZTE Corporation et al. "Msg2 payload contents for 2-step Rach" R2-1817064; 3GPP TSG-RAN WG2 Meeting #104; Spokane, USA, Nov. 12-16, 2018. 9 pages.
Zte et al. "Considerations on 2-Step RACH Procedures" R1-1901627; 3GPP TSG-RAN WG1 Meeting #96; Athens, Greece, Feb. 25-Mar. 1, 2019. 11 pages.
Zte et al. "Remaining details of RACH procedure" R1-1717036; 3GPP TSG-RAN WG1 Meeting #90bis; Prague, Czech Republic, Oct. 9-13, 2017. 25 pages.
3GPP TS 38.321 V15.8.0 (Dec. 2019)—3rd Generation Partnership Project; Technical Specification Group Radio Access Network; NR; Medium Access Control (MAC) protocol specification (Release 15) (78 pages).
International Search Report issued Nov. 29, 2019 of PCT /CN2019/ 078786 (6 pages).
Non-Final Rejection for American U.S. Appl. No. 17/477,048 Issued Oct. 26, 2023, 76 Pages.
Examination report of the European application No. 19920463.7, issued on Jul. 20, 2023. 10 pages.
Decision of Refusal of the Japanese application No. 2021-556595, issued on Aug. 15, 2023. 7 pages with English translation.
Decision of Rejection of the Chinese application No. 202111184645. 1, issued on Aug. 24, 2023. 19 pages with English translation.
Third Office Action of the European application No. 19920380.3, issued on Jan. 25, 2024. 5 pages.

(56) References Cited

OTHER PUBLICATIONS

Notice of allowance of the Chinese application No. 202111184645.1, issued on Jan. 26, 2024. 8 pages with English translation.
Notice of Allowance of the U.S. Appl. No. 17/477,048, issued on Mar. 11, 2024. 39 pages.
Corrected Notice of Allowability of the U.S. Appl. No. 17/477,048, issued on Mar. 25, 2024. 2 pages.
Fourth Office Action of the European application No. 19920380.3, issued on Apr. 3, 2024. 5 pages.

\* cited by examiner

WIRELESS COMMUNICATION METHOD, TERMINAL DEVICE, AND NETWORK DEVICE

CROSS-REFERENCE TO RELATED APPLICATION

The present application is a continuation application of International PCT Application No. PCT/CN2019/078786, filed on Mar. 19, 2019, the entire content of which is hereby incorporated by reference.

TECHNICAL FIELD

Implementations of the present disclosure relate to a field of communication, and more specifically, to a wireless communication method, a terminal device and a network device.

BACKGROUND

In a 5G New Radio (NR) system, in order to reduce a random access delay, a two-step random access procedure is considered. In this case, what contents are included in the messages sent by the two-step random process, and how to solve a problem of contention conflict are urgent problems to be solved.

SUMMARY

A wireless communication method, a terminal device and a device are provided, which can solve a problem of contention conflict in a two-step random access.

In a first aspect, a wireless communication method is provided, which includes: sending, by a terminal device, a first message to a network device, wherein the first message includes a preamble identity (ID) for a random access and an uplink message, and the uplink message includes a first identity; determining, by the terminal device, a target radio network temporary identity (RNTI) according to the first identity; monitoring, by the terminal device, a PDCCH scrambled by the target RNTI; and determining whether a contention conflict is resolved according to a second message scheduled by the PDCCH and the uplink message.

In a second aspect, a wireless communication method is provided, which includes: receiving, by a network device, a first message sent by a terminal device, wherein the first message includes a preamble identity (ID) for a random access and an uplink message, and the uplink message includes a first identity; and determining, by the network device, a second message for replying to the terminal device according to a decoding situation of the first message.

In a third aspect, a terminal device is provided, which is used for performing the method in the above first aspect or any possible implementation of the first aspect. Specifically, the terminal device includes units for performing the method in the first aspect or any possible implementation of the first aspect.

In a fourth aspect, a network device is provided, which is used for performing the method in the above second aspect or any possible implementation of the second aspect. Specifically, the network device includes units for performing the method in the second aspect or any possible implementation of the second aspect.

In a fifth aspect, a terminal device is provided, which includes: a processor and a memory. The memory is configured to store a computer program, and the processor is configured to call and run the computer program stored in the memory to execute the method in the above first aspect or various implementations thereof.

In a sixth aspect, a network device is provided, which includes: a processor and a memory. The memory is configured to store a computer program, and the processor is configured to call and run the computer program stored in the memory to perform the method in the second aspect or various implementations thereof.

In a seventh aspect, a chip is provided, and configured to implement the method in any one of the above first to second aspects or various implementations thereof.

Specifically, the chip includes a processor, which is configured to call and run a computer program from a memory to enable a device in which the chip is installed to perform the method in any one of the above first aspect and second aspect or various implementations thereof.

In an eighth aspect, a computer readable storage medium is provided, which is configured to store a computer program, the computer program enables a computer to perform the method according to any one of the first and second aspects described above and various implementations thereof.

In a ninth aspect, a computer program product is provided, which includes computer program instructions, the computer instructions enable a computer to perform the method according to any one of the first and second aspects described above and various implementations thereof.

In a tenth aspect, a computer program is provided, when the computer program is run on a computer, the computer is enabled to perform the method according to any one of the first and second aspects described above and various implementations thereof.

Based on the above technical solution, the terminal device may send a first message to the network device in the two-step random access, wherein the first message includes a random access preamble ID and an uplink message, and the uplink message may include a first identity. The terminal device may further monitor a PDCCH scrambled by a specific RNTI according to the first identity, so as to determine whether the contention conflict is resolved according to a second message scheduled by the PDCCH and the uplink message.

DETAILED DESCRIPTION

Technical solutions in implementations of the present disclosure will be described below with reference to drawings in the implementations of the present disclosure. It is apparent that the implementations described are just some of the implementations of the present disclosure, but not all of the implementations of the present disclosure. Based on the implementations of the present disclosure, all other implementations achieved by a person of ordinary skill in the art without paying inventive efforts are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
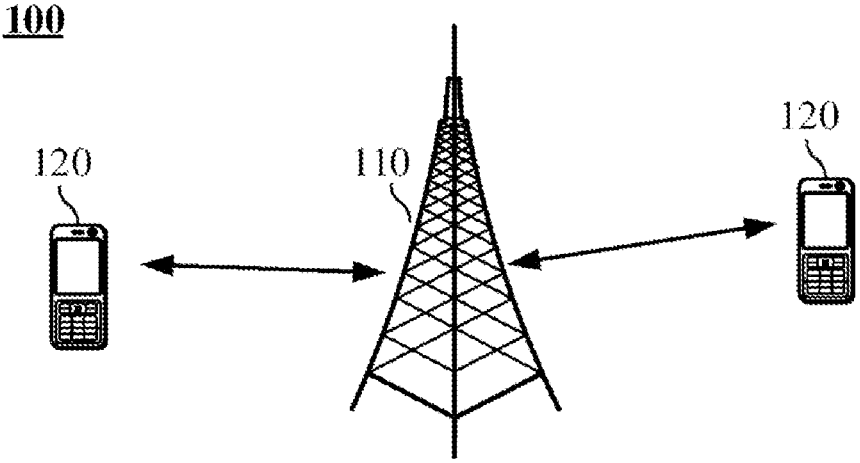
FIG. 1 shows a schematic diagram of an application scenario according to an implementation of the present disclosure.

Illustratively, a communication system 100 to which an implementation of the present disclosure is applied is shown in FIG. 1. The communication system 100 may include a network device 110. The network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a mobile switch center, a relay station, an access point, a vehicle-mounted device, a wearable device, a hub, a switch, a bridge, a router, a network side device in a 5G network, or a network device in a future evolved Public Land Mobile Network (PLMN), etc.

The wireless communication system 100 further includes at least one terminal 120 located within the coverage range of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular telephone, a Personal Communication System (PCS) terminal capable of combining a cellular wireless telephone and data processing, faxing and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

Optionally, a device to device (D2D) communication may be performed between the terminal devices 120.

Optionally, the 5G system or 5G network may be referred to as a New Radio (NR) system or an NR network.

FIG. 1 illustrates one network device and two terminal devices, for example. Optionally, the communication system 100 may include multiple network devices, and other numbers of terminal devices may be included within the coverage range of each network device, which are not limited in the implementations of the present disclosure.

Optionally, the communication system 100 may include other network entities, such as a network controller and a mobile management entity, which are not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described repeatedly herein. The communication device may also include other devices in the communication system 100, such as network controllers and mobile management entities and other network entities, which are not limited in the implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In a 5G NR system, a contention-based random access procedure may adopt a four-step random access procedure (MSG 1-MSG 4) similar to LTE.

In MSG 1, a terminal device sends a random access preamble (or called preamble sequence) identity (preamble index) to a network device.

In MSG 2, after detecting the preamble index sent by the terminal device, the network device sends a random access response (RAR) to the terminal device to inform the terminal device of uplink resource information that may be used when sending MSG3, allocates a Radio Network Temporary Identity (RNTI) to the terminal device, and provides a time alignment command to the terminal device. If the terminal device does not detect the RAR within an RAR time window, the terminal device performs a retransmission of the preamble index. If the terminal device detects the RAR within an RAR time window, the terminal device performs a transmission of MSG3 according to an uplink grant (UL grant) resource indicated by the RAR. A random access radio network temporary identity (RA-RNTI) used by the network device for sending the RAR is calculated according to locations of time-frequency resources of PRACH. A Physical Downlink Shared Channel (PDSCH) corresponding to a Physical Downlink Control Channel (PDCCH) scrambled by the RA-RNTI may include responses to multiple preambles.

In MSG 3, after receiving the RAR, the terminal device sends an MSG3 message in an uplink resource designated by the RAR. The step allows Hybrid Automatic Repeat reQuest (HARQ) retransmission.

In MSG 4, the network device sends an MSG4 message to the terminal device, wherein the MSG4 message includes a contention resolution message. The step allows HARQ retransmission. Upon receiving MSG 4 sent by the network device, the terminal device may detect whether MSG 4 includes a part of the MSG3 message sent by the terminal device, that is, Contention Resolution ID. If MSG 4 includes the part of the MSG3 message, it indicates that the random access procedure of the terminal device is successful; otherwise, it is considered that the random process is failed, and the terminal device needs to start a random access procedure from MSG 1 again.

Or, if MSG3 contains a Cell radio network temporary identity (C-RNTI) Media Access Control (MAC) Control Element (CE), it is decided whether MSG4 is scheduled by a PDCCH scrambled by C-RNTI. If UE blindly detects a PDCCH scrambled by C-RNTI, the random access procedure is successful; otherwise, it is considered that the random process is failed, and the terminal device needs to start a random access procedure from MSG 1 again.

It can be seen that the four-step random access procedure has a large delay and cannot meet a requirement for the delay in 5G NR. Therefore, a two-step random access procedure is considered to be adopted, so as to meet the requirement for the delay in 5G NR.

Specifically, in a first step, the terminal device sends msgA to the network device, wherein the msgA may include the aforementioned MSG1 and MSG 3.

In a second step, the network device sends msgB to the terminal device, wherein the msgB may include the aforementioned MSG2 and MSG4.

However, what are specifically included in the msgA and the msgB and how to solve the contention conflict are urgent problems to be solved.

In view of this, an implementation of the present disclosure provides a contention resolution method for a two-step random access, which can solve the conflict problem in the two-step random access.

Figure 2:
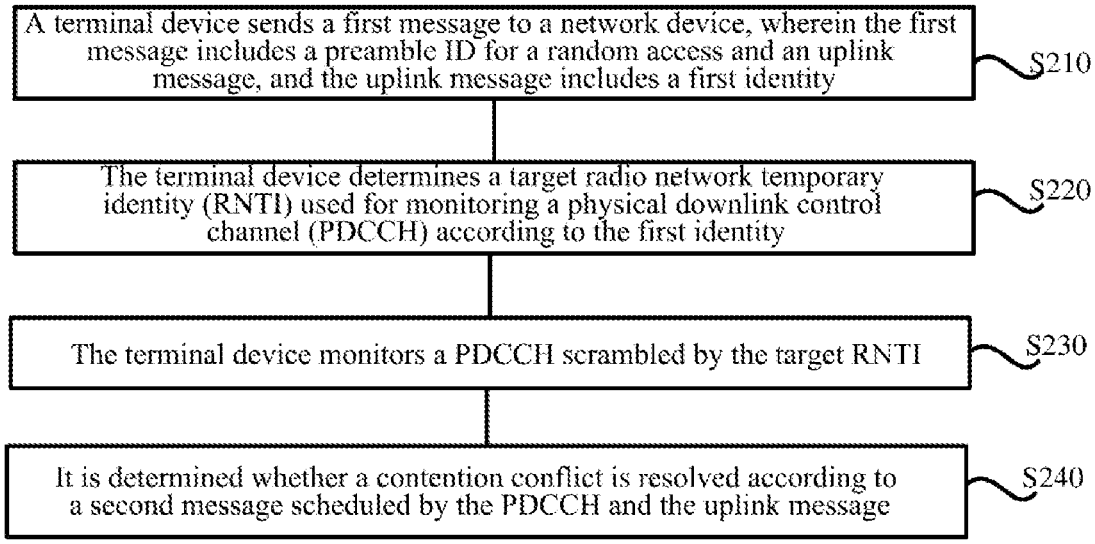
FIG. 2 shows a schematic flowchart of a wireless communication method according to an implementation of the present disclosure.

FIG. 2 is a schematic flowchart of a wireless communication method 200 according to an implementation of the present disclosure. As shown in FIG. 2, the method 200 includes following acts S210-S240.

In S210, the terminal device sends a first message to a network device, wherein the first message includes a preamble ID for a random access and an uplink message, and the uplink message includes a first identity.

In S220, the terminal device determines a target radio network temporary identity (RNTI) used for monitoring a physical downlink control channel (PDCCH) according to the first identity.

In S230, the terminal device monitors a PDCCH scrambled by the target RNTI.

In S240, it is determined whether the contention conflict is resolved according to a second message scheduled by the PDCCH and the uplink message.

Optionally, in an implementation of the present disclosure, before sending the first message, the terminal device may determine resources for sending the first message, specifically including Physical Random Access Channel (PRACH) resources for sending a preamble index, and Physical Uplink Shared Channel (PUSCH) resources for sending the uplink message (or called paload). Further, the terminal device may transmit the preamble index on the PRACH resource and the uplink message on the PUSCH resource.

Optionally, in an implementation of the present disclosure, the PRACH resource and the PUSCH resource may have a corresponding relationship, that is, after determining the PRACH resource, the PUSCH resource may be determined according to the corresponding relationship.

In an implementation of the present disclosure, the uplink message includes the first identity, and the content included in the uplink message is different according to different events for triggering the random access.

Optionally, in some implementations, events that trigger a random access may include following events.

Event 1: RRC connection re-establishment procedure) in an idle state. In this case, the uplink message does not include C-RNTI.

Event 2: RRC connection re-establishment procedure. In this case, the uplink message does not include C-RNTI.

Event 3: Handover. In this case, the uplink message includes C-RNTI.

Event 4: DL or UL data arrival during RRC_CONNECTED when UL synchronization status is "non-synchronized". The uplink message includes C-RNTI.

Event 5: UL data arrival during RRC_CONNECTED when there is no PUCCH resource for Scheduling Request (SR) available. In this case, the uplink message includes C-RNTI.

Event 6: SR failure. In this case, the uplink message includes C-RNTI.

Event 7: Request by RRC upon synchronous reconfiguration. In this case, the uplink message includes C-RNTI.

Event 8: Transition from RRC_INACTIVE. In this case, the uplink message does not include C-RNTI.

Event 9: To establish a time alignment at SCell addition. In this case, the uplink message includes C-RNTI.

Event 10: Request for other System Information (SI). In this case, the uplink message includes C-RNTI.

Event 11: Beam failure recovery. In this case, the uplink message includes C-RNTI.

That is to say, if the terminal device is in the RRC_CONNECTED state, the terminal device may know C-RNTI. In this case, the first identity in the uplink message may be C-RNTI, for example, the C-RNTI may be contained in a Media Access Control (MAC) Control Element (CE) of the uplink message.

Or, if the terminal device is in a disconnected state, such as RRC_IDLE state or RRC_INACTIVE state, in a random access procedure triggered in these states, the terminal device may not know the C-RNTI. In this case, the uplink message may include a Common control channel (CCCH) service data unit (SDU). The CCCH SDU may include Radio Resource Control (RRC) messages transmitted in Signaling Radio Bearers (SRB) 0, for example, RRC messages such as RRCSetupRequest, RRCResumeRequest, RRCReestablishmentRequest, and RRCSystemInfoRequest request.

In some implementations, the CCCH SDU may include the first identity. In this case, the first identity is different from C-RNTI. As an example but not a limitation, the first identity may be one of the following:

a random number with a fixed number of bits;
Next Generation 5G Short Temporary Mobile Subscription Identifier (NG-5G-S-TMSI);
I-RNTI, used for identifying the context of a terminal device in an inactive state; and
short I-RNTI.

Therefore, the first identity may be used for indicating a connection state in which the terminal device is. After receiving the first message, the network device may determine the connection state in which the terminal device is according to the first identity in the first message, and further may choose different response modes. For example, for a terminal device whose contention conflict is resolved, the network device may carry a matching identity in a response message to indicate to the terminal device that its contention conflict is resolved. For example, if the first identity is the C-RNTI, and the terminal device blindly detects a PDCCH scrambled by C-RNTI, the terminal device determines that the contention conflict of the terminal device is resolved.

Optionally, in some implementations of the present disclosure, the terminal device may monitor a PDCCH scrambled by a corresponding RNTI according to a connection state in which the terminal device itself is.

For example, if the terminal device is in a connected state, the terminal device may know the C-RNTI, so the terminal device may monitor a PDCCH scrambled by the first C-RNTI.

Alternatively, for another example, if the terminal device is in a disconnected state, the terminal device may not know the C-RNTI. In this case, the terminal device may monitor other RNTI except the C-RNTI, for example, a PDCCH scrambled by the random access RA-RNTI.

Optionally, in an implementation of the present disclosure, the RA-RNTI may be determined according to a PRACH resource sending the preamble index, for example, calculated by the following formula:

$$\text{RA-RNTI} = 1 + s\_id + 14 \times t\_id + 14 \times 80 \times f\_id + 14 \times 80 \times 8 \times ul\_carrier\_id.$$

s_id is an index of a first OFDM symbol of the PRACH resource ($0 \leq s\_id < 14$).
t_id is an index of a first slot of a PRACH resource in a system frame ($0 \leq t\_id < 80$).
f_id is an index of a PRACH timing in a frequency domain ($0 \leq f\_id < 8$).
ul_carrier_id is a UL carrier used for a preamble index transmission.

It can be known from the determination mode of the RA-RNTI that, since a time-frequency position of the preamble index sent by the terminal device is determined, when the network device decodes the preamble index, the network device also obtains a time-frequency position of the PRACH resource sending the preamble index, so that corresponding RA-RNTI may be used to scramble a PDCCH when the contention conflict of the terminal device is resolved.

It should be noted that the mode for determining the RA-RNTI by the terminal device may be the same as or different from the existing determination mode, which is not specifically limited in an implementation of the present disclosure. For example, the terminal device may determine the RA-RNTI according to the resources for transmitting the first message and/or the resources for transmitting the preamble sequence.

Optionally, in some implementations, after S210, the method 200 may further include: starting, by the terminal device, a first timer or a first window.

Further, within a duration range of the first timer, the terminal device may monitor a PDCCH scrambled by the corresponding RNTI according to the first identity.

For example, if the first identity is C-RNTI, the terminal device may monitor a PDCCH scrambled by C-RNTI before the first timer expires or within the first window. Or if the first identity is other information, the terminal device may monitor a PDCCH scrambled by the RA-RNTI before the first timer expires.

Optionally, in some implementations, the terminal device may start the first timer after sending the random access preamble, or the terminal device may start the first timer after sending the uplink message. A starting timing of the first timer is not specifically limited in an implementation of the present disclosure.

Optionally, in an implementation of the present disclosure, if the first identity is C-RNTI, the terminal device may monitor a PDCCH scrambled by the C-RNTI within a time window (within a time range during which the first timer has not expired). If a PDCCH scrambled by the C-RNTI is successfully monitored, it is determined that the contention conflict of the terminal device is resolved. Or if the terminal device does not monitor a PDCCH scrambled by the C-RNTI within the time window, it is determined that the contention conflict of the terminal device is not resolved.

Optionally, in another implementation of the present disclosure, if the first identity is other information except C-RNTI, such as a random number or NG-5G-S-TMSI, the terminal device may monitor a PDCCH scrambled by the RA-RNTI before the first timer expires. If a PDCCH scrambled by the RA-RNTI is successfully monitored, it is determined whether the contention conflict is resolved according to a second message scheduled by the PDCCH. Or, if the terminal device does not monitor a PDCCH scrambled by the RA-RNTI before the first timer expires, it is determined that the contention conflict is not resolved.

Optionally, in some implementations, determining whether the contention conflict is resolved according to the second message scheduled by the PDCCH and the uplink message includes:

determining that the contention conflict is not resolved if the second message does not include a second identity; or determining that the contention conflict is not resolved if the second message includes a second identity and the second identity does not match the uplink message; or determining the contention conflict is resolved if the second message includes a second identity and the second identity matches the uplink message.

The second identity is a contention resolution Identity (ID) of the terminal device.

It should be understood that in an implementation of the present disclosure, the terminal device may blindly detect multiple PDCCHs scrambled by RA-RNTI. For example, if the terminal device blindly detects a first PDCCH scrambled by the RA-RNTI, but the second identity in the second message scheduled by the first PDCCH does not match uplink message in the first message, or the second message does not include the second identity, the terminal device may also continue to blindly detect a PDCCH scrambled by the RA-RNTI till the timer expires.

In an implementation of the present disclosure, the second message includes a random access response of the network device to the first message, and the second message may be one or more MAC Protocol Data Units (PDUs), wherein the MAC PDU includes one or more MAC subPDUs. In some cases, the MAC subPDU is in one of the following formats:

Format 1: the MAC subPDU only includes a MAC sub-header.

Format 2: the MAC subPDU includes a MAC sub-header and a MAC service data unit (SDU).

Format 3: the MAC subPDU includes a MAC sub-header and a MAC control element (CE).

Format 4: the MAC subPDU includes a MAC sub-header and a padding bit.

Optionally, in some implementations, the second identity may be contained in the MAC CE, that is, if the MAC subPDUs included in the MAC PDU are all in one or more of format 1, format 2 or format 4, it may be considered that the second message does not include the second identity, and it may be determined that the contention conflict of the terminal device is not resolved.

Or, if the MAC PDU includes a MAC subPDU of format 3, that is, the MAC subPDU includes a MAC CE and the MAC CE includes the second identity, the terminal device may match the MAC CE including the second identity with the uplink message in the first message to determine whether the contention conflict of the terminal device is resolved.

For example, if the uplink message is CCCH SDU and includes M bits, the MAC CE includes N bits, wherein M is greater than or equal to N.

The terminal device may match N bits of the CCCH SDU with N bits of the MAC CE to determine whether the contention conflict of the terminal device is resolved. For example, if N bits of the CCCH SDU are the same as N bits of the MAC CE, it may be determined that the uplink message matches the second identity. Or, if there is at least one different bit between N bits of the CCCH SDU and N bits of the MAC CE, it may be determined that the second identity does not match the uplink message. If M is greater than N, N bits of the CCCH SDU are first N bits of the CCCH SDU.

Optionally, in some implementations, N is 48.

Optionally, in some implementations, the second message also includes at least one of following:

a backoff Indicator (BI), which is used for indicating whether to back off to a four-step random access;

uplink timing;

a Cell radio network temporary identity (C-RNTI) or Temporary Cell Radio Network Temporary Identity (TC-RNTI); and at least one Random Access Preamble Identify (RAPID).

A structure of a MAC PDU in an implementation of the present disclosure is described in detail below with reference to FIG. 3 to FIG. 6.

Figure 3:
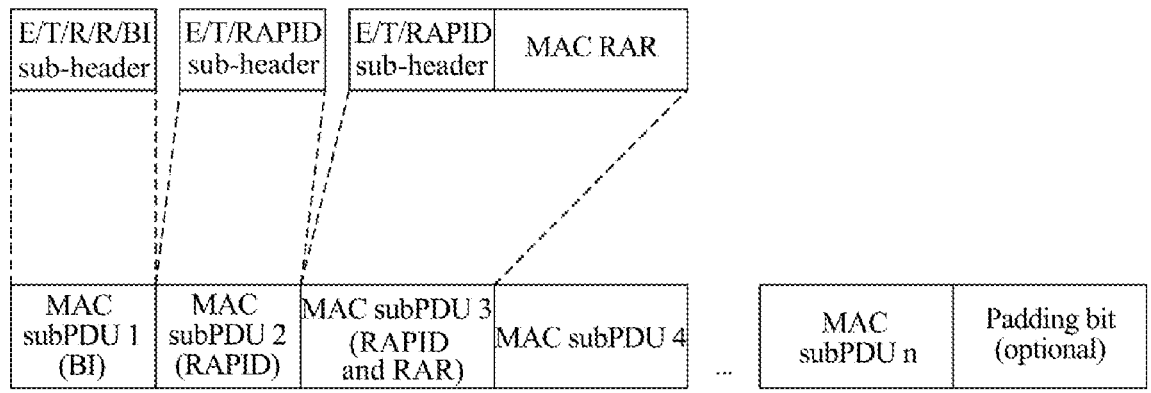
FIG. 3 shows an example schematic diagram of a format of a MAC PDU according to an implementation of the present disclosure.

In an implementation of the present disclosure, the MAC PDU may be composed of one or more MAC subPDUs and a possible padding bit, as shown in FIG. 3.

It should be understood that MAC PDU shown in FIG. 3 is only a possible structure, and in other implementations, the MAC PDU may only include part of MAC subPDUs, and this is not limited by the implementations of the present disclosure.

Figure 4:
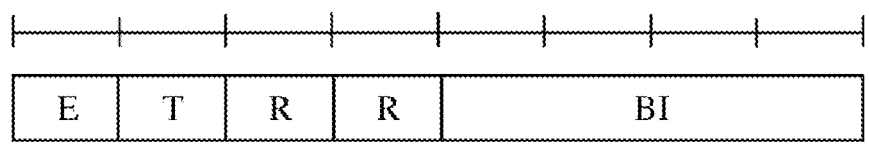
FIG. 4 shows an example schematic diagram of a MAC sub-header format.

Optionally, in some implementations, the MAC sub-header may be a BI sub-header for carrying BI, the BI may be used for indicating whether to back off to a four-step random access. In a specific implementation, as shown in FIG. 4, the BI sub-header includes an extension field (E), a type field (T), two reserved fields (R) and a BI value.

Figure 5:
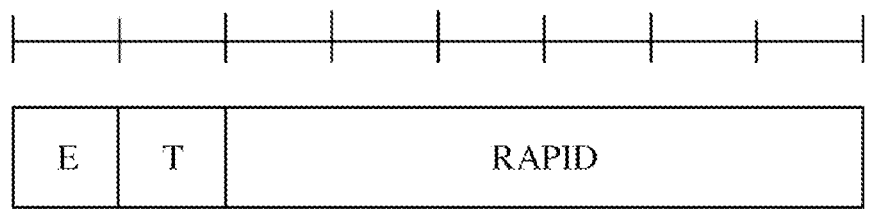
FIG. 5 shows another example schematic diagram of a MAC sub-header format.

Optionally, in some implementations, the MAC sub-header may be a RAPID sub-header. In a specific implementation, as shown in FIG. 5, the RAPID sub-header may include an E, a T and a RAPID value. The RAPID is a preamble index in the first message received by the network device.

Optionally, in an implementation of the present disclosure, the RAPID sub-header may also include information such as length information of the CCCH SDU and a Logical Channel Identify (LCID), which is not limited in an implementation of the present disclosure.

In an implementation of the present disclosure, the network device may indicate the terminal device whether to back off to a four-step random access through RAPID.

Specifically, the network device may receive the first message sent by the terminal device and learn the preamble index from the first message. Further, the network device may determine the content carried in the second message according to the decoding situation of the preamble index and the uplink message in the first message. For example, if the network device successfully decodes the preamble index successfully and does not decode the uplink message successfully, in this case, the network device may carry at least one RAPID in the second message, wherein the at least one RAPID may correspond to the preamble index sent by the terminal device for which the uplink message is not decoded successfully, which is used for indicating the terminal device corresponding to the at least one RAPID to back off to the four-step random access procedure.

That is, the terminal device may determine whether to send the third message (corresponding to MSG3) to the network device according to at least one RAPID included in MAC PDU and the preamble ID in the first message. For example, if there is a RAPID in the at least one RAPID that is consistent with the preamble index in the first message, it is determined to send the third message. Further, the terminal device sends the third message on an uplink resource (UL grant) indicated by the MAC PDU. Or, if there is no RAPID in the at least one RAPID that is consistent with the preamble index in the first message, it is determined not to send the third message.

Figure 6:
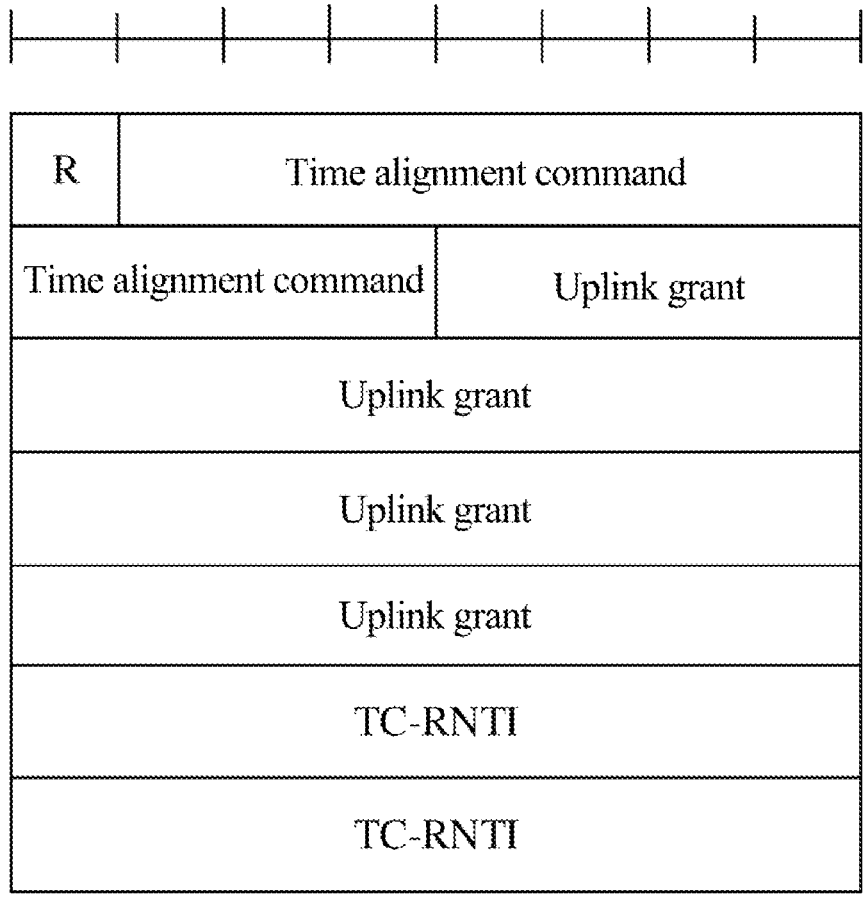
FIG. 6 shows an example schematic diagram of a MAC RAR format.

FIG. 6 is a schematic structure diagram of MAC RAR of an implementation of the present disclosure. As shown in FIG. 6, the MAC RAR may include:

Reserved bit R (for example, 1 bit);
Time alignment command (TAC);
Uplink grant (UL grant); and
C-RNTI or TC-RNTI.

TAC is used for specifying a time adjustment amount required by an uplink synchronization of the terminal device, for example, TAC may include 12 bits. UL grant is used for indicating uplink resources allocated to MSG3.

If the network device detects preamble indexes from multiple terminal devices on a same PRACH resource, one MAC PDU may be used to respond to random access requests of these terminal devices, and each preamble index response corresponds to one RAR. In other words, if multiple terminal devices send preamble indexes on a same PRACH resource (same time-frequency position), corresponding RARs may be multiplexed in a same MAC PDU.

That is to say, if terminal devices in an unconnected state use the same PRACH resource to send preamble indexes (the preamble indexes are not necessarily the same), then these terminal devices all may monitor a same PDCCH scrambled by a RA-RNTI and receive a same MAC PDU. Different RARs may be indicated by different RAPIDs.

It should be understood that above formats of BI subheader, RAPID sub-header and RAR are only examples, and their formats may be flexibly adjusted according to the actual carried information. Information such as the SDU data length and the LCID may also be carried in sub-headers of other MAC subPDUs, which is not limited in the implementations of the present disclosure.

Optionally, in some implementations, if the MAC PDU includes a first MAC subPDU and a second MAC subPDU, the first MAC subPDU includes a second identity and the second MAC subPDU includes the RAPID, the first MAC PDU is located before the second MAC PDU in the MAC PDU. That is, the MAC subPDU carrying the second identity is located before MAC subPDU carrying RAPID.

Optionally, in some implementations, the MAC PDU includes a third MAC subPDU, wherein the third MAC subPDU includes BI, and the third MAC subPDU is a first MAC subPDU in the MAC PDU. That is, if a BI sub-header is included, the BI sub-header is a first sub-header of the MAC PDU.

Optionally, in some implementations, the MAC PDU includes a fourth MAC subPDU, wherein the fourth MAC subPDU includes a padding bit, and the fourth MAC subPDU is a last MAC subPDU in the MAC PDU. That is, the MAC subPDU including a padding bit is a last sub header of the MAC PDU.

Optionally, in some implementations, the uplink timing TAC is included in a MAC CE of the MAC subPDU. The C-RNTI or TC-RNTI is included in the MAC CE of the MAC subPDU. The uplink timing and the C-RNTI or TC-RNTI are included in a same MAC CE.

The wireless communication method according to an implementation of the present disclosure is described in detail above from a perspective of the terminal device in connection with FIG. 2 to FIG. 6. Next, a wireless communication method according to another implementation of the present disclosure will be described in detail from a perspective of the network device in connection with FIG. 7. It should be understood that the description of the network device side corresponds to the description of the terminal device side, and the above description may be referred to for similar descriptions, which will not be repeated here to avoid repetition.

Figure 7:
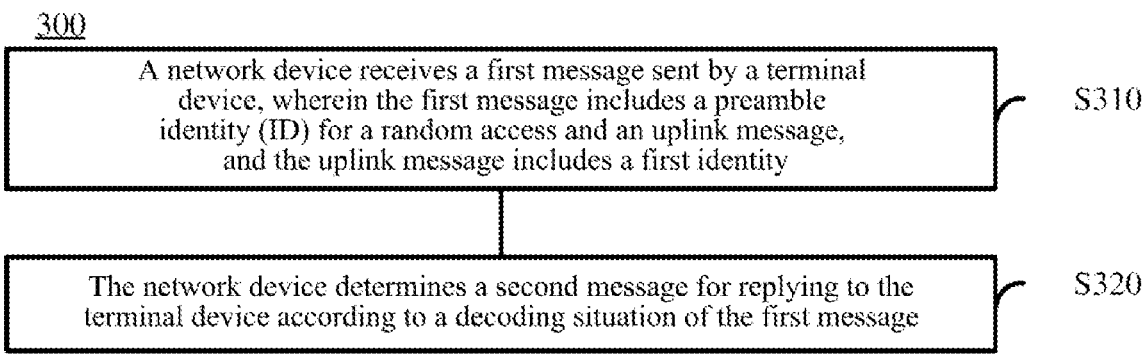
FIG. 7 shows a schematic flowchart of a wireless communication method according to an implementation of the present disclosure.

FIG. 7 is a schematic flow chart of a wireless communication method 300 according to another implementation of the present disclosure. The method 300 may be performed by the network device in the communication system shown in FIG. 1. As shown in FIG. 7, the method 300 includes S310 and S320.

In S310, a network device receives a first message sent by a terminal device, wherein the first message includes a preamble identity (ID) for a random access and an uplink message, and the uplink message includes a first identity.

S320, the network device determines a second message for replying to the terminal device according to a decoding situation of the first message.

It should be understood that in an implementation of the present disclosure, the decoding situation of the first message may include situations 1 to 3.

Situation 1: decoding of the preamble ID (preamble index) is successful, but decoding of the uplink message is failed.

Situation 2: decoding of the preamble Index is successful, and decoding of the uplink message is successful.

Situation 3: decoding of the preamble index is failed, and decoding of the uplink message is failed.

In situation 1, because terminal devices may use a same PRACH resource to send the preamble index, and different terminal devices may choose the same RPACH resource and the same preamble index, the network device cannot distinguish UEs based on the preamble index.

In this case, the network device may reply with RAR, i.e., MSG2. Thus, for a two-step RACH terminal device, it may back off to a four-step RACH, i.e., MSG3 (i.e., the uplink message) is sent. For a four-step RACH UE, a normal random access procedure is performed, i.e., MSG3 is also sent to the network device.

Or, the network device sends first indication information to the terminal device, for indicating the terminal device to retransmit the first message. Optionally, the network device may also send second indication information, for indicating the terminal device to stop monitoring PDCCH, so as to retransmit the first message as soon as possible.

Specifically, if the network device can distinguish whether the terminal device is a terminal device that initiates a four-step random access or a terminal device that initiates a two-step random access procedure, for example, through different PRACH resources, then for the terminal device of the two-step random access procedure, the network device may send first indication information to the terminal device for indicating the terminal device to retransmit the first message, and may also send second indication information to the terminal device for indicating the terminal device to stop monitoring PDCCH. Or, for the terminal device of the four-step random access procedure, the terminal device only needs to perform a normal random access procedure.

For situation 2, the network device may send a second message to the terminal device, wherein the second message includes a second identity, and the second identity is a contention resolution ID of the terminal device.

It can be seen from the above description that the first identity may be used for indicating a connection state in which the terminal device is. Therefore, after receiving the first message, the network device may determine the connection state in which the terminal device is according to the first identity in the first message, and further may select the content carried in the second message. For example, for a terminal device whose contention conflict is resolved, the network device may carry a matched second identity in a response message to indicate to the terminal device that the contention conflict of the terminal device is resolved.

For situation 3, the network device may indicate the terminal device to retransmit the first message, and may also indicate the terminal device to stop monitoring PDCCH at the same time.

Optionally, in some implementations, the second message is a media access control (MAC) protocol data unit (PDU), wherein the MAC PDU includes one or more MAC sub-PDU, and the MAC subPDU is in one of the following formats:
  the MAC subPDU only includes a MAC sub-header;
  the MAC subPDU includes a MAC sub-header and a MAC service data unit (SDU);
  the MAC subPDU includes a MAC sub-header and a MAC control element (CE); and
  the MAC subPDU includes a MAC sub-header and a padding bit.

Optionally, in some implementations, the uplink message is a common control channel (CCCH) service data unit (SDU) and includes M bits, wherein the second identity is contained in a MAC CE and includes N bits, M is greater than or equal to N, and N bits of MAC CE are used for matching with N bits of CCCH SDU to determine whether the contention conflict is resolved. If M is greater than N, N bits of CCCH SDU are first N bits of the CCCH SDU.

Optionally, in some implementations, N is 48.

Optionally, in some implementations, it is determined that the second identity is not included in the second message if a MAC subPDU in the second message is in one of the following formats:
  the MAC subPDU only includes a MAC sub-header;
  the MAC subPDU includes a MAC sub-header and a MAC service data unit (SDU);
  the MAC subPDU includes a MAC sub-header and a padding bit.

Optionally, in some implementations, the second message includes at least one message of following:
  a Backoff Indicator (BI) for indicating whether to back off to a four-step random access;
  uplink timing;
  a cell radio network temporary identity (C-RNTI) or temporary cell radio network temporary identity (TC-RNTI); and
  at least one random access preamble identity (RAPID).

Optionally, in some implementations, the MAC subPDU includes a BI sub-header for carrying the BI. Or, the MAC subPDU includes a RAPID sub-header, wherein the RAPID sub-header is used for carrying RAPID.

Optionally, in some implementations, the RAPID sub-header also includes an SDU data length and a logical channel identity (LCID).

Optionally, in some implementations, the MAC PDU includes a first MAC subPDU and a second MAC subPDU, wherein the first MAC subPDU includes a second identity and the second MAC subPDU includes the RAPID. The first MAC PDU is located before the second MAC subPDU in the MAC PDU.

Optionally, in some implementations, the MAC PDU includes a third MAC subPDU, wherein the third MAC subPDU includes BI. The third MAC subPDU is a first MAC subPDU in the MAC PDU.

Optionally, in some implementations, the MAC PDU includes a fourth MAC subPDU, wherein the MAC subPDU includes a padding bit. The fourth MAC subPDU is a last MAC subPDU of MAC PDU.

Optionally, in some implementations, the uplink timing is contained in a MAC CE of the MAC subPDU; the C-RNTI or TC-RNTI is contained in a MAC CE of the MAC subPDU; the uplink timing and the C-RNTI or TC-RNTI are contained in a same MAC CE.

Optionally, in some implementations, the first identity is at least one of following:
  C-RNTI;
  a random number with a fixed number of bits;
  NG-5G-S-temporary mobile subscriber identity (TMSI);
  I-RNTI, used for identifying context information of a terminal device in an inactive state; and
  short I-RNTI.

Method implementations of the present disclosure are described in detail above with reference to FIG. 2 to FIG. 7, apparatus implementations of the present disclosure will be described in detail below with reference to FIG. 8 to FIG. 12. It should be understood that the apparatus implementations and the method implementations correspond to each other, and description of the method implementations may be referred to for similar description of the apparatus implementations.

Figure 8:
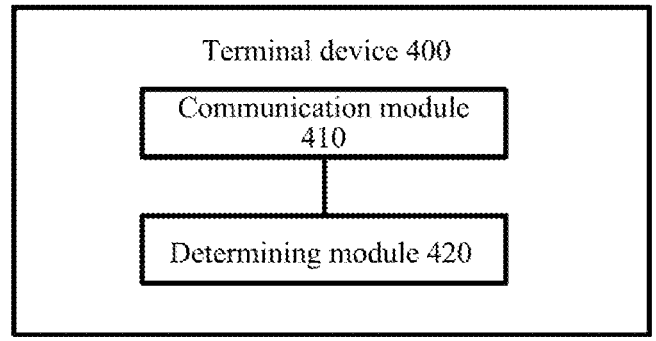
FIG. 8 shows a schematic block diagram of a terminal device according to an implementation of the present disclosure.

FIG. 8 is a schematic block diagram of a terminal device 400 according to an implementation of the present disclosure. As shown in FIG. 8, the terminal device 400 includes a communication module 410 and a determining module 420.

The communication module 410 is configured to send a first message to a network device, wherein the first message includes a preamble identity (ID) for a random access and an uplink message, and the uplink message includes a first identity.

The determining module 420 is configured to determine a target radio network temporary identity (RNTI) used for monitoring a physical downlink control channel (PDCCH) according to the first identity.

The communication module 410 is further configured to monitor a PDCCH scrambled by the target RNTI.

The determining module 420 is further configured to determine whether a contention conflict is resolved according to a second message scheduled by the PDCCH and the uplink message.

Optionally, in some implementations, the determining module 420 is specifically configured to: determine a first cell radio network temporary identity (C-RNTI) as the target RNTI if the first identity is the first C-RNTI; or determine a random access RA-RNTI as the target RNTI if the first identity is other information except C-RNTI.

Optionally, in some implementations, the device 400 further includes: a processing module, configured to start a first timer after sending the sixth information to the network device.

The communication module 410 is further configured to: monitor the PDCCH scrambled by the target RNTI within a duration range of the first timer.

Optionally, in some implementations, the processing module is specifically configured to: start the first timer after sending the preamble ID; and start the first timer after sending the uplink message.

Optionally, in some implementations, the determining module 420 is specifically configured to: determine that the contention conflict is not resolved if the second message does not include a second identity; or determine that the contention conflict is not resolved if the second message includes a second identity and the second identity does not match the uplink message; or determine the contention conflict is resolved if the second message includes the second identity and the second identity matches the uplink message.

The second identity is a contention resolution ID of the terminal device.

Optionally, in some implementations, the second message is a media access control (MAC) protocol data unit (PDU), wherein the MAC PDU includes one or more MAC sub-PDU, and MAC subPDU is in one of the following formats:
the MAC subPDU only includes a MAC sub-header;
the MAC subPDU includes a MAC sub-header and a MAC service data unit (SDU);
the MAC subPDU includes a MAC sub-header and a MAC control element (CE);
the MAC subPDU includes a MAC sub-header and a padding bit.

Optionally, in some implementations, the uplink message is a common control channel (CCCH) service data unit SDU and includes M bits, and the second identity is included in a MAC CE of the MAC subPDU and includes N bits, wherein M is greater than or equal to N.

That the second identity matches with the uplink message includes: N bits of CCCH SDU are the same as N bits of MAC CE.

That the second identity does not match with the uplink message includes: there is at least one different bit between N bits of the CCCH SDU and N bits of the MAC CE.

If M is greater than N, N bits of CCCH SDU are first N bits of CCCH SDU.

Optionally, in some implementations, N is 48.

Optionally, in some implementations, the determining module is further configured to: determine that the second identity is not included in the second message if a MAC subPDU in the second message is in one of the following formats:
the MAC subPDU only includes a MAC sub-header;
the MAC subPDU includes a MAC sub-header and a MAC service data unit (SDU); and
the MAC subPDU includes a MAC sub-header and a padding bit.

Optionally, in some implementations, the second message includes at least one message of following:
a Backoff Indicator (BI), for indicating whether to back off to a four-step random access;
uplink timing;
a cell radio network temporary identity (C-RNTI) or temporary cell radio network temporary identity TC-RNTI; and
at least one random access preamble identity (RAPID).

Optionally, in some implementations, MAC subPDU includes a BI sub-header for carrying BI. or, the MAC subPDU includes a RAPID sub-header, wherein the RAPID sub-header is used for carrying the RAPID.

Optionally, in some implementations, the RAPID sub-header also includes an SDU data length and a logical channel identity (LCID).

Optionally, in some implementations, the MAC PDU includes a first MAC subPDU and a second MAC subPDU, wherein the first MAC subPDU includes a second identity and the second MAC subPDU includes the RAPID.

The first MAC subPDU is located before the second MAC subPDU, in the MAC PDU.

Optionally, in some implementations, the MAC PDU includes a third MAC subPDU, wherein the third MAC subPDU includes BI.

The third MAC subPDU is a first MAC subPDU of the MAC PDU.

Optionally, in some implementations, the MAC PDU includes a fourth MAC subPDU, wherein the fourth MAC subPDU includes a padding bit.

The fourth MAC subPDU is a last MAC subPDU of the MAC PDU.

Optionally, in some implementations, the uplink timing is contained in a MAC CE of the MAC subPDU.

The C-RNTI or TC-RNTI is contained in a MAC CE of the MAC subPDU.

The uplink timing and C-RNTI or TC-RNTI are contained in a same MAC CE.

Optionally, in some implementations, the determining module 420 is further configured to: determine whether to send a third message according to the at least one RAPID and the preamble ID in the first message, wherein the third message is used for sending the uplink message.

Optionally, in some implementations, the determining module 420 is specifically configured to: determine to send the third message if there is a RAPID in the at least one RAPID that is consistent with the preamble ID in the first message; or determine not to send the third message if there is no RAPID in the at least one RAPID that is consistent with the preamble ID in the first message.

Optionally, in some implementations, the second message includes an uplink resource allocated by the network device for the terminal device, and the communication module 410 is further configured to: send the uplink message on the uplink resource.

Optionally, in some implementations, the first identity is at least one of following:
C-RNTI;
a random number with a fixed number of bits;
NG-5G-S-temporary mobile subscriber identity (TMSI);
I-RNTI, used for identifying context information of a terminal device in an inactive state; and
short I-RNTI.

Optionally, in some implementations, the determining module 420 is further configured to: determine RA-RNTI according to random access resource used for sending the first message.

Optionally, in some implementations, the determining module 420 is specifically configured to: determine the RA-RNTI according to the random access resources used for sending the first message and a first correspondence, wherein the first correspondence is a correspondence between the random access resource and RA-RNTI.

It should be understood that the terminal device 400 according to an implementation of the present disclosure may correspond to the terminal device in a method implementation of the present disclosure, and the above-mentioned and other operations and/or functions of various units in the terminal device 400 are respectively for implementing the corresponding flows of the terminal device in the method 200 as shown in FIG. 2, which will not be repeated here for brevity.

Figure 9:
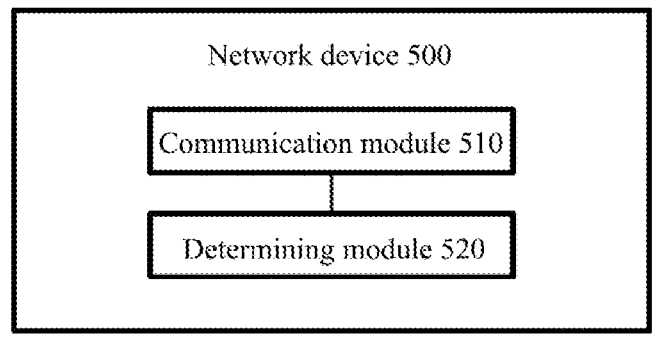
FIG. 9 shows a schematic block diagram of a network device according to an implementation of the present disclosure.

FIG. 9 is a schematic block diagram of a network device according to an implementation of the present disclosure. The network device 500 in FIG. 9 includes a communication module 510 and a determining module 520.

The communication module 510 is configured to receive a first message sent by a terminal device, wherein the first message includes a preamble identity (ID) for a random access and an uplink message, and the uplink message includes a first identity.

The determining module 520 is configured to determine a second message for replying to the terminal device according to a decoding situation of the first message.

Optionally, in some implementations, the communication module 510 is further configured to: send a random access response (RAR) to the terminal device if decoding of the preamble ID is decoded successful and decoding of the uplink message is failed; or send first indication information to the terminal device for indicating the terminal device to retransmit the first message if decoding of the preamble ID is successful and decoding of the uplink message is failed.

Optionally, in some implementations, the communication module 510 is further configured to: send second indication information for indicating the terminal device to stop monitoring a physical downlink control channel (PDCCH) if decoding of the preamble ID is successful and decoding of the uplink message is failed.

Optionally, in some implementations, the communication module 510 is further configured to: send a second message to the terminal device if decoding of the preamble ID is successful and decoding of the uplink message is successful, wherein the second message includes a second identity, and the second identity is a contention resolution ID of the terminal device.

Optionally, in some implementations, the second message is a media access control (MAC) protocol data unit (PDU), wherein the MAC PDU includes one or more MAC subPDUs, and the MAC subPDU is in one of the following formats:
  the MAC subPDU only includes a MAC sub-header;
  the MAC subPDU includes a MAC sub-header and a MAC service data unit (SDU);
  the MAC subPDU includes a MAC sub-header and a MAC control element (CE); and
  the MAC subPDU includes a MAC sub-header and a padding bit.

Optionally, in some implementations, the uplink message is a common control channel (CCCH) service data unit (SDU) and includes M bits, and the second identity is contained in a MAC CE and includes N bits, wherein M is greater than or equal to N, and N bits of the MAC CE are used for matching with N bits of the CCCH SDU to determine whether the contention conflict is resolved.

If M is greater than N, N bits of CCCH SDU are first N bits of CCCH SDU.

Optionally, in some implementations, N is 48.

Optionally, in some implementations, the second message does not include the second identity if a MAC subPDU in the second message is in one of the following formats:
  the MAC subPDU only includes a MAC sub-header;
  the MAC subPDU includes a MAC sub-header and a MAC service data unit (SDU);
  the MAC subPDU includes a MAC sub-header and a padding bit.

Optionally, in some implementations, the second message further includes at least one message of following:
  a Backoff Indicator (BI) for indicating whether to back off to a four-step random access;
  uplink timing;
  a cell radio network temporary identity (C-RNTI) or temporary cell radio network temporary identity (TC-RNTI); and
  at least one random access preamble identity (RAPID).

Optionally, in some implementations, the MAC subPDU includes a BI sub-header for carrying the BI. Or, the MAC subPDU includes a RAPID sub-header, and the RAPID sub-header is used for carrying RAPID.

Optionally, in some implementations, the RAPID sub-header also includes an SDU data length and a logical channel identity (LCID).

Optionally, in some implementations, the MAC PDU includes a first MAC subPDU and a second MAC subPDU, wherein the first MAC subPDU includes a second identity and the second MAC subPDU includes the RAPID.

The first MAC PDU is located before the second MAC PDU, in the MAC PDU.

Optionally, in some implementations, the MAC PDU includes a third MAC subPDU, wherein the third MAC subPDU includes BI.

The third MAC subPDU is a first MAC subPDU in the MAC PDU.

Optionally, in some implementations, the MAC PDU includes a fourth MAC subPDU, wherein the fourth MAC subPDU includes a padding bit.

The fourth MAC subPDU is a last MAC subPDU in the MAC PDU.

Optionally, in some implementations, the uplink timing is contained in a MAC CE of the MAC subPDU.

The C-RNTI or TC-RNTI is contained in a MAC CE of the MAC subPDU.

The uplink timing and the C-RNTI or TC-RNTI are included in a same MAC CE.

Optionally, in some implementations, the first identity is at least one of following:
  C-RNTI;
  a random number with a fixed number of bits;
  NG-5G-S-temporary mobile subscriber identity (TMSI);
  I-RNTI, used for identifying context information of a terminal device in an inactive state; and
  short I-RNTI.

Specifically, the network device 500 may correspond to (e.g., may be configured in or be itself) the network device described in the method 300, and various modules or units in the network device 500 are respectively used for executing various actions or processes performed by the network device in the method 300. Herein, in order to avoid redundancy, detailed description thereof is omitted.

Figure 10:
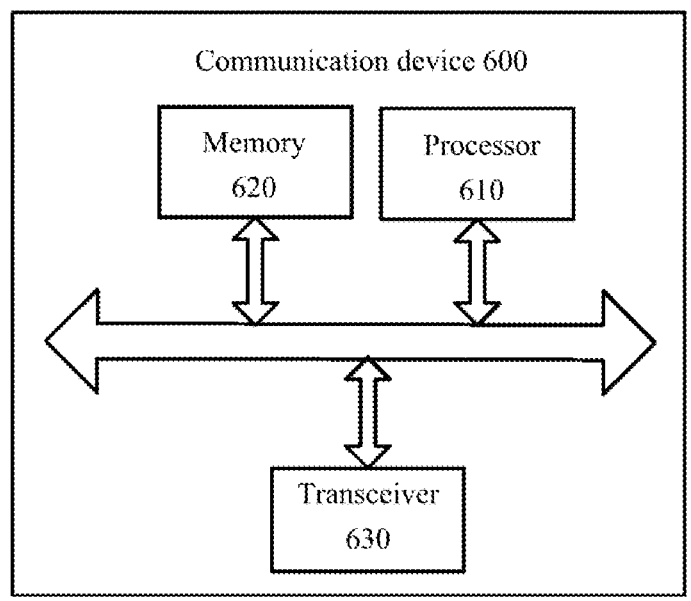
FIG. 10 shows a schematic block diagram of a communication device according to an implementation of the present disclosure.

FIG. 10 is a schematic diagram of a structure of a communication device 600 according to an implementation of the present disclosure. The communication device 600 shown in FIG. 10 includes a processor 610 that can call and run a computer program from a memory to implement the methods in the implementations of the present disclosure.

Optionally, as shown in FIG. 10, the communication device 600 may further include a memory 620. The processor 610 may call and run the computer program from the memory 620 to implement the methods according to the implementations of the present disclosure.

The memory 620 may be a separate device independent of the processor 610 or may be integrated in the processor 610.

Optionally, as shown in FIG. 10, the communication device 600 may further include a transceiver 630, and the processor 610 may control the transceiver 630 to communicate with other devices. Specifically, the transceiver 730 may send information or data to other devices or receive information or data sent by other devices.

The transceiver 630 may include a transmitter and a receiver. The transceiver 630 may further include antennas, the number of which may be one or more.

Optionally, the communication device 600 may be specifically a network device in an implementation of the present disclosure, and the communication device 600 may implement the corresponding processes implemented by the network device in various methods of the implementations of the present disclosure, which will not be repeated here for brevity.

Optionally, the communication device 600 may specifically be a mobile terminal/terminal device in an implementation of the present disclosure, and the communication device 600 may implement the corresponding processes implemented by the mobile terminal/terminal device in various methods of the implementations of the present disclosure, which will not be repeated here for brevity.

Figure 11:
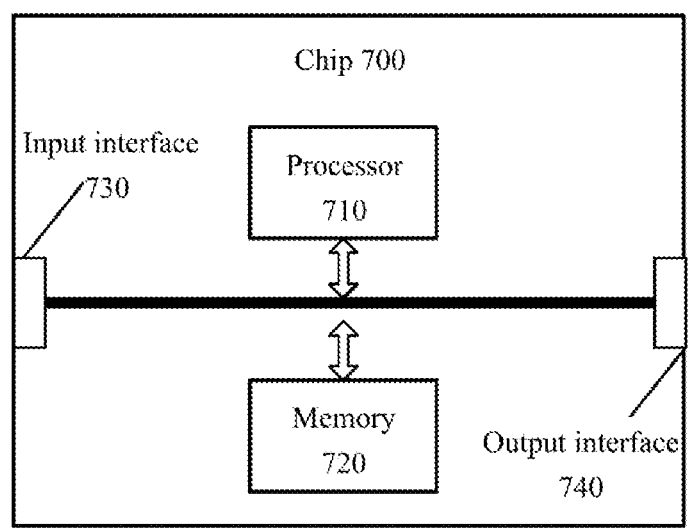
FIG. 11 shows a schematic block diagram of a chip according to an implementation of the present disclosure.

FIG. 11 is a schematic diagram of a structure of a chip of an implementation of the present disclosure. A chip 700 shown in FIG. 11 includes a processor 710. The processor 710 may call and run a computer program from a memory to implement a method in an implementation of the present disclosure.

Optionally, as shown in FIG. 11, the chip 700 may further include a memory 720. The processor 710 may call and run the computer program from the memory 720 to implement the methods according to the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 910 may acquire information or data sent by other devices or chips.

Optionally, the chip 700 may further include an output interface 740. The processor 710 may control the output interface 740 to communicate with other devices or chips. Specifically, the processor 910 may output information or data to other devices or chips.

Optionally, the chip may be applied to a network device in an implementation of the present disclosure, and the chip may implement the corresponding processes implemented by the network device in various methods of the implementations of the present disclosure, which will not be repeated here for brevity.

Optionally, the chip may be applied to a mobile terminal/terminal device in an implementation of the present disclosure, and the chip may implement the corresponding processes implemented by the mobile terminal/terminal device in various methods of the implementations of the present disclosure, which will not be repeated here for brevity.

It should be understood that the chip mentioned in the implementations of the present disclosure may be referred to as a system-level chip, a system chip, a chip system or a system-on-chip, etc.

Figure 12:
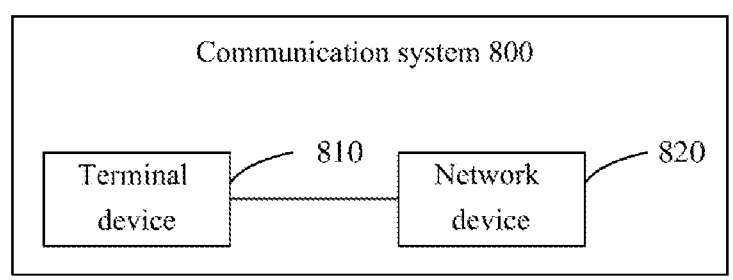
FIG. 12 shows a schematic block diagram of a communication system according to an implementation of the present disclosure.

FIG. 12 is a schematic block diagram of a communication system 800 provided according to an implementation of the present disclosure. As shown in FIG. 12, the communication system 800 may include a terminal device 810 and a network device 820.

Herein, the terminal device 810 may be configured to implement corresponding functions implemented by the terminal device in the above-mentioned methods, and the network device 820 may be configured to implement corresponding functions implemented by the network device in the above-mentioned methods, which will not be repeated here for brevity.

It should be understood that the processor in the implementations of the present disclosure may be an integrated circuit chip having a signal processing capability. In an implementation process, the acts of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or other programmable logic device, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in combination with the implementations of the present disclosure may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and performs the acts of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through illustrative but not restrictive description, various forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described as an example but not restrictive explain. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

An implementation of the present disclosure further provides a computer readable storage medium configured to store a computer program.

Optionally, the computer readable storage medium may be applied to a network device in an implementation of the present disclosure, and the computer program enables a computer to perform the corresponding processes implemented by the network device in various methods of the implementations of the present disclosure, which are not repeated here for brevity.

Optionally, the computer readable storage medium may be applied to a mobile terminal/terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied to a network device in an implementation of the present disclosure, and the computer program instructions enable a computer to perform the corresponding processes implemented by the network device in various methods of the implementations of the present disclosure, which are not repeated here for brevity.

Optionally, the computer program product may be applied to a mobile terminal/terminal device in an implementation of the present disclosure, and the computer program instructions enable a computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied to a network device in an implementation of the present disclosure. When the computer program is run on a computer, the computer is enabled to perform the corresponding processes implemented by the network device in various methods of the implementations of the present disclosure, which are not repeated here for brevity.

Optionally, the computer program may be applied to a mobile terminal/terminal device in an implementation of the present disclosure. When the computer program is run on a computer, the computer is enabled to perform the corresponding processes implemented by the mobile terminal/terminal device in various methods of the implementations of the present disclosure, which will not be repeated here for brevity.

A person of ordinary skill in the art may recognize that the elements and algorithm acts in various examples described in combination with the implementations disclosed herein may be implemented in electronic hardware, or a combination of computer software and electronic hardware. Whether these functions are implemented in hardware or software depends on a specific application and design constraints of the technical solution. Skilled artisans may use various methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations, which are not repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementation. For example, multiple units or components may be combined or integrated into another system, or some features may be ignored or not executed. On the other hand, the displayed or discussed coupling or direct coupling or communication connection between each other may be an indirect coupling or communication connection between devices or units through some interfaces, which may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

When the functions are implemented in a form of software functional unit and sold or used as an independent product, the software functional units may be stored in a computer readable storage medium. Based on such understanding, the technical solution of the present disclosure, in essence, or the part contributing to the prior art, or the part of the technical solution, may be embodied in the form of a software product. The computer software product is stored in a storage medium, and includes several instructions for instructing a computer device (which may be a personal computer, a server, or a network device, etc.) to perform all or part of the acts of various implementations of the present disclosure. The aforementioned storage medium may include any medium that can store program codes, such as a USB flash disk, a mobile hard disk, a read-only memory (ROM), a random access memory (RAM), a magnetic disk, or an optical disk.

What are described above are merely example implementations of the present disclosure, but the protection scope of the present disclosure is not limited thereto. Any variation or substitution that may readily conceived by a person skilled in the art within the technical scope disclosed by the present disclosure shall fall within the protection scope of the present disclosure. Therefore, the protection scope of the present disclosure shall be subject to the protection scope of the claims.

What I claim is:

1. A wireless communication method, comprising:
   sending, by a terminal device, a first message to a network device, wherein the first message comprises a preamble identity (ID) for a random access and an uplink message, and the uplink message comprises a first identity;
   determining, by the terminal device, a target radio network temporary identity (RNTI) used for monitoring a physical downlink control channel (PDCCH) according to the first identity;
   monitoring, by the terminal device, a PDCCH scrambled by the target RNTI; and
   determining whether a contention conflict is resolved according to a second message scheduled by the PDCCH and the uplink message;
   wherein determining whether the contention conflict is resolved according to the second message scheduled by the PDCCH and the uplink message comprises:

determining that the contention conflict is not resolved when the second message does not comprise a contention resolution ID of the terminal device;

wherein when the second message comprises a Backoff Indicator (BI) and at least one random access preamble identity (RAPID), the method further comprises:

determining to send a third message when there is a RAPID in the at least one RAPID that is consistent with the preamble ID in the first message, wherein the third message is configured to send the uplink message.

2. The method of claim 1, wherein determining, by the terminal device, the target radio network temporary identity (RNTI) used for monitoring the physical downlink control channel PDCCH according to the first identity comprises:

determining, by the terminal device, a first cell radio network temporary identity (C-RNTI) as the target RNTI if the first identity is the first C-RNTI, or, determining, by the terminal device a random access radio network temporary identity (RA-RNTI) as the target RNTI if the first identity is other information except C-RNTI.

3. The method of claim 2, further comprising:

starting, by the terminal device, a first timer after sending the first message to the network device;

monitoring, by the terminal device, the PDCCH scrambled by the target RNTI comprises:

monitoring, by the terminal device, the PDCCH scrambled by the target RNTI within a duration range of the first timer, wherein after sending, by the terminal device, the first message to the network device comprises:

after sending, by the terminal device, the preamble ID;

after sending, by the terminal device, the uplink message.

4. The method of claim 1, further comprising:

determining, by the terminal device, the RA-RNTI according to a random access resource used for sending the first message, wherein determining, by the terminal device, the RA-RNTI according to the random access resource used for sending the first message comprises:

determining, by the terminal device, the RA-RNTI according to the random access resource used for sending the first message and a first correspondence, wherein the first correspondence is a correspondence between the random access resource and the RA-RNTI.

5. A wireless communication method, comprising:

receiving, by a network device, a first message sent by a terminal device, wherein the first message comprises a preamble identity (ID) for a random access and an uplink message, and the uplink message comprises a first identity; and determining, by the network device, a second message for replying to the terminal device according to a decoding situation of the first message;

wherein determining, by the network device, the second message for replying to the terminal device according to the decoding situation of the first message comprises:

sending, by the network device, the second message to the terminal device when decoding of the preamble ID is successful and decoding of the uplink message is failed, wherein the second message does not comprise a contention resolution ID of the terminal device, but comprises a Backoff Indicator (BI) and at least one random access preamble identity (RAPID);

wherein the terminal device is configured to send a third message when there is a RAPID in the at least one RAPID that is consistent with the preamble ID in the first message, wherein the third message is configured to send the uplink message.

6. A terminal device, comprising: a processor and a transceiver, wherein the transceiver is configured to send a first message to a network device, wherein the first message comprises a preamble identity (ID) for a random access and an uplink message, wherein the uplink message comprises a first identity; and the processor is configured to determine a target radio network temporary identity (RNTI) used for monitoring a physical downlink control channel (PDCCH) according to the first identity;

wherein the transceiver is further configured to monitor a PDCCH scrambled by the target RNTI;

the processor is further configured to determine whether a contention conflict is resolved according to a second message scheduled by the PDCCH and the uplink message;

wherein the processor is specifically configured to:

determine that the contention conflict is not resolved when the second message does not comprise a contention resolution ID of the terminal device;

wherein when the second message comprises a Backoff Indicator (BI) and at least one random access preamble identity (RAPID), the processor is further configured to:

determining to send a third message when there is a RAPID in the at least one RAPID that is consistent with the preamble ID in the first message, wherein the third message is configured to send the uplink message.

7. The terminal device of claim 6, wherein the processor is specifically configured to:

determine a first cell radio network temporary identity (C-RNTI) as the target RNTI if the first identity is the first C-RNTI; or determine a random access radio network temporary identity (RA-RNTI) as the target RNTI if the first identity is other information except C-RNTI.

8. The terminal device of claim 6, where the processor is further configured to start a first timer after sending the first message to the network device;

wherein the transceiver is further configured to:

monitor the PDCCH scrambled by the target RNTI within a duration range of the first timer, wherein the processor is specifically configured to:

start the first timer after sending the preamble ID;

start the first timer after sending the uplink message.

9. The terminal device of claim 6, wherein the processor is further configured to:

determine the RA-RNTI according to a random access resource used for sending the first message, wherein the processor is specifically configured to:

determine the RA-RNTI according to the random access resource used for sending the first message and a first correspondence, wherein the first correspondence is a correspondence between the random access resource and the RA-RNTI.

10. A network device, comprising: a processor and a transceiver, wherein the transceiver is configured to receive a first message sent by a terminal device, wherein the first message comprises a preamble identity (ID) for a random access and an uplink message, and the uplink message comprises a first identity; and the processor is configured to determine a second message for replying to the terminal device according to a decoding situation of the first message;

wherein the transceiver is further configured to:

send a second message to the terminal device when decoding of the preamble ID is successful and decoding of the uplink message is failed; wherein the second message does not comprise a contention resolution ID of the terminal device, but comprises a Backoff Indicator (BI) and at least one random access preamble identity (RAPID) for the terminal device determining to send a third message when there is a RAPID in the at least one RAPID that is consistent with the preamble ID in the first message, wherein the third message is configured to send the uplink message.

* * * * *